Nov. 3, 1953  C. H. FAY ET AL  2,657,581
GRAVITY METER

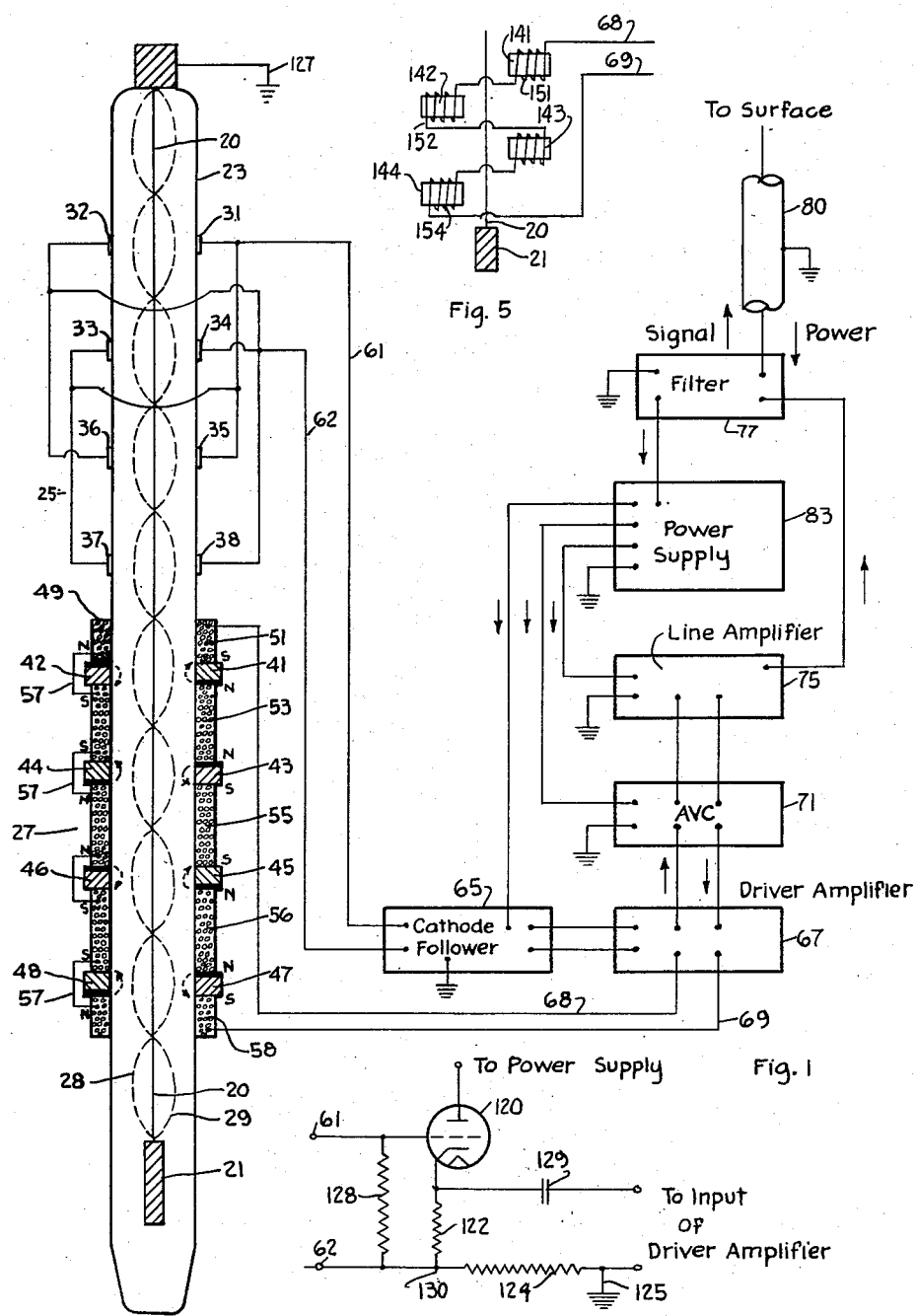

Filed July 24, 1950  2 Sheets-Sheet 2

Inventors:
Charles H. Fay
Richard R. Goodell
By
Their Attorney

Patented Nov. 3, 1953

2,657,581

UNITED STATES PATENT OFFICE 2,657,581

GRAVITY METER

Charles H. Fay and Richard R. Goodell, Houston, Tex., assignors to Shell Development Company, San Francisco, Calif., a corporation of Delaware Application July 24, 1950, Serial No. 175,542

4 Claims. (Cl. 73—382)

This invention pertains to gravity meters such, for example, as used for purposes of geophysical exploration, and relates more particularly to a gravity meter especially suitable for use in deep wells, at the bottom of the sea and in other difficultly accessible places.

A gravity meter of this type must satisfy definite requirements. It should have a range of the order of 1000 milligals and an accuracy within 1 milligal. Its housing should preferably have an outside diameter of not over 4½ inches, and should be able to withstand pressures of the order of 6000 lbs. square inch. The meter must be operative at temperatures such as 230° F., which occur in deep wells, and should preferably be provided with thermostatic means capable of maintaining the instrument at a constant temperature of about 250° F. The meter should preferably be of the self-leveling type, and should be capable of giving direct readings at the surface by means of a telemetering system.

It is an object of this invention to provide a gravity meter meeting the above requirements, and more particularly to provide an instrument adapted to measure the gravitational force as a function of the frequency of vibration of a string supporting a mass in a gravitational field.

Other objects of the present invention will appear from the following description taken with reference to the appended drawings wherein:

Fig. 1 diagrammatically shows that part of the present gravity meter system which is adapted to be lowered into a well on a conductor cable;

Fig. 2 is a diagram of the cathode follower circuit of the system of Fig. 1;

Fig. 3 diagrammatically shows the complete system of the present invention, that is, the system of Fig. 1 in circuit with further measuring units located at the surface;

Fig. 5 is a diagram showing an alternative electromagnetic transducer arrangement.

Since the frequency of transverse vibrations of a string of a given length is proportional to the square root of the tension force applied thereto, gravitational forces can be measured by suspending a mass on a string and determining the tension force exerted by said mass on said string in a given gravitational field by accurately measuring the natural frequency of vibration of the system.

Figure 4:
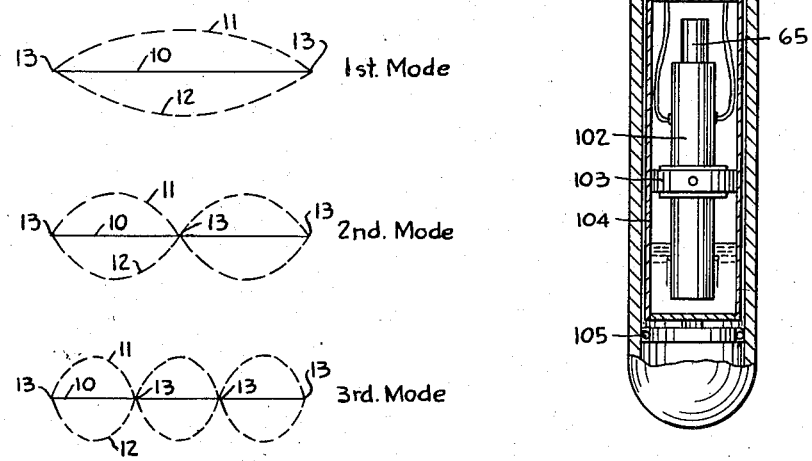
Fig. 4 is a diagram illustrating various modes of vibration.

The vibration of a string is built up of a sum of normal modes of oscillation or vibration, each one of which is a simple harmonic motion. Fig. 4 illustrates by way of an example the vibration of a string 10 oscillating between positions 11 and 12 according to the first, second and third mode of oscillation respectively. For small amplitudes, the displacement of the string at any instant of time is nearly a sine curve for a pure normal mode. Each normal mode therefore has two or more points indicated at 13, which are called nodes and have no displacement with time. These nodes divide the string into a number of equal lengths or loops, whose number depends on the order of the mode, the frequency of oscillation of the string at a particular mode being nearly proportional to the order of the mode. For example, if a string 10 inches long is vibrated at the 10th mode, the nodes will occur at one-inch intervals, that is, at 0, 1, 2, 3, 4, 5, 6, 7, 8, 9 and 10 inch distances from each of the ends of the string, as illustrated in Fig. 1 with regard to the string 20.

Any normal mode of vibration can be utilized for the purposes of this invention. However, it is preferred to use a relatively high-order mode, such for example as the 10th mode. This gives a higher frequency which increases the ease of accuracy of measurements and decreases the error caused by imperfect clamping. If too high a mode is used, however, the rigidity of the string becomes significant and introduces errors due to thermoelastic coefficients. Also, the length of each loop becomes so short that it is difficult to provide adequate means for causing and detecting oscillation at the desired mode.

Referring to Fig. 1, a mass 21, which is, for example, of the order of 5 grams, is suspended on a string or wire 20 having a small cross section such as 1 mil and preferably a very small coefficient of thermal expansion, such, for example, as a nickel-steel alloy technically known as Invar (see Handbook of Chemistry and Physics, 31st edition, p. 1297). The length of the string is not critical and may have a value such as 10 inches.

The suspended mass system is placed in a container such as an elongated tube 23, which is preferably made of a material such as glass and is evacuated to a high degree of vacuum to decrease the damping of the wire by air friction.

A pick-up transducer generally shown at 25 and a driving transducer generally shown at 27 are positioned laterally of the wire 20 adjacent the container 23, and are suitably oriented with regard thereto and to each other, as will be described hereinbelow.

The present invention will be described with regard to the use of an electrostatic pick-up transducer 25 and an electromagnetic driving transducer 27. It is however understood that electrostatic, magnetic or any other types of transducers can be interchangeably used either for pick-up or for driving purposes, the term transducer being broadly used herein to define any agency or means for converting electrical energy into mechanical energy or vice versa. It is however preferred to use two different types of transducers, as shown in Fig. 1, there being under these conditions a minimum of direct coupling between the transducers, since the electrostatic transducer 25 is substantially insensitive to stray electromagnetic fields, while the electromagnetic transducer 27 is substantially insensitive to stray electrostatic fields.

Assuming that it is desired to oscillate the string 20 at the 10th mode of vibration between the extreme positions shown on an exaggerated scale by the dotted lines 28 and 29, the string will have ten loops comprised between eleven nodes, as shown in Fig. 1.

The pick-up transducer 25 may in such case comprise a plurality of reactor elements or detecting condenser plates 31, 33, 35 and 37, connected in parallel with each other and placed at equal distances midway between adjacent nodes on diametrically opposite sides of the wire 20 and container 23. The transducer 25 also comprises a plurality of balancing condenser plates 32, 34, 36 and 38, also connected in parallel with each other and located diametrically opposite to plates 31, 33, 35 and 37 respectively.

The condenser plates 31—37 and the balancing condenser plates 32—38 may be formed in any suitable manner, for example, as metallic plates affixed on the outside glass walls of container 23, or as metallic or colloidal graphite paint placed directly thereon, the latter being preferred since it minimizes the effect of electrical charges and currents on the glass container or tube. As stated above, the plates are centered between the nodes of the string 20, and may have an axial length such as 0.5 inch and a width of 0.125 inch for a nodal spacing of one inch, used herein as an example.

The electromagnetic driving transducer 27 comprises a plurality of reactor elements such as permanent magnets 41, 42, 43, 44, 45, 46, 47 and 48, made of a magnetic material having a high retentivity, such as cunico (see "Engineering Alloys" by Woldman and Metzler, ASM, 1945, p. 539). For a size of apparatus such as mentioned above, the magnets may have a cross-sectional area such as $\frac{3}{16}$ sq. in. and a length such as ¼ inch. The magnets are positioned adjacent the outer wall of tube 23, and are properly oriented with regard to the string and to the pick-up transducer, being located substantially in the vertical plane passing through the string 20 and the condenser plates 31—38. The spacing between the magnets and their positions with regard to nodal points is the same as for the condenser plates. The polarity of the magnets is as shown by letters N and S in the drawing, the north pole faces of the magnets being further indicated by a black line.

Surrounding the tube 23 and wound coaxially therearound is a coil generally shown at 49, which may consist of a plurality of coil sections 51, 53, 55, 56 and 58, the magnets being located or imbedded between said coils or surrounded thereby from above and below. The coils are wound so as to produce a single solenoidal magnetic field along the axis of the tube 23, the connections between the coil sections being shown at 57.

Although the arrangement shown in Fig. 1 and described hereinabove relates to a particular number of detecting and driving reactor elements, it is understood that any other number thereof, compatible with the length of the string and the desired mode of oscillation, may be likewise used by properly positioning said elements with regard to nodal points, an extreme case being, for example, one detecting and one driving reactor element.

It is also understood that instead of the coil and permanent magnets shown in Fig. 1, the electromagnetic transducer, as shown in Fig. 5, may comprise reactor elements consisting of soft iron cores 141, 142, 143 and 144, to which a proper polarization is applied by the current flowing in coils 151, 152, 153 and 154, wound in proper relationship to said cores.

The output of the pick-up transducer 25 is applied, through leads 61 and 62, to a cathode follower circuit or unit 65, whose output is in turn applied, through a driver amplifier unit 67 and leads 68 and 69, to the input of the driving transducer 27. The operation of the driver amplifier 67 is stabilized by means of an AVC or automatic volume control circuit 71, which serves likewise to transmit signals from the transducer means to a line amplifier 75, filter 77 and cable 80. The cable 80, which is preferably an insulated, single-conductor cable having an armor sheath as a grounded return lead, serves also to supply the present system with operating current by means of the filter 77 and power supply circuit 83.

Figure 3:
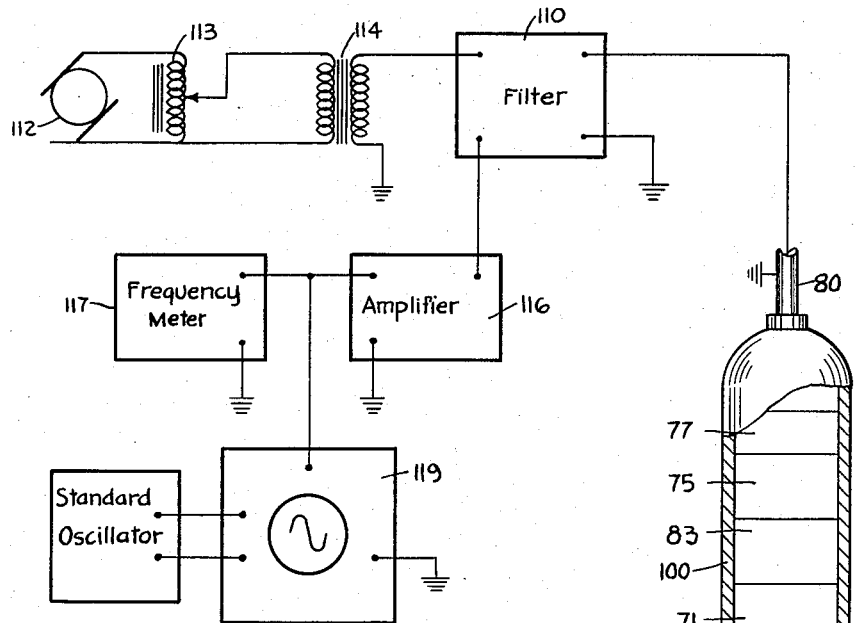

When it is desired to use the present system for gravity measurements in difficultly accessible places, such as in deep wells or under the surface of the sea, the elements and circuits of Fig. 1 are placed in a fluid and pressure tight housing such as shown at 100 in Fig. 3, which is lowered to the desired place at the end of the cable 80.

In such case, the tube 23, together with the transducers 25 and 27, is enclosed in a metallic tubular case 102, which is mounted on gimbals to insure vertical positioning within a second tubular case 104. The case 104 is centered within the housing 100 by means of roller bearings 105 and suspended against shocks by means of a plurality of springs 106, serving also as electrical leads.

The case 102 contains also the necessary thermostatic means for maintaining the present gravity meter at the desired constant temperature such, for example, at 140° C. with an accuracy of about ±0.01° C. when operating in deep wells. Such thermostatic system, which may be of any suitable conventional type, forms no part of this invention and is therefore not described or shown herein. It should be noted however that the thermostatic system described in our copending application Serial No. 148,238, filed March 7, 1950, now Patent No. 2,616,020, is particularly suitable for use with the present invention.

The housing 100 is preferably built to withstand high pressures, such as 6,000 p. s. i. or more, and encloses, beside case 102, all the other units of Fig. 1, that is, the driver amplifier 67, AVC circuit 71, power supply circuit 83 and filter circuit 77. The cathode follower circuit or unit 65 may be mounted directly on top of the tube 23 within case 102, such arrangement having the advantage of decreasing stray capacitances by decreasing the length of conductors between the pickup transducer and the cathode follower.

Connected at the surface to the other end of cable 80 are the other units or circuits of the present system, as shown in Fig. 3. These comprise another filter 110, a source of power, such as a standard power line or a motor generator 112, supplying preferably a 110 volt 60 cycle operating current through an adjustable voltage transformer 113 and an isolating step-up transformer 114. This makes it possible to supply the desired operating voltage to the circuits in the housing 100 over and above the losses occurring in the cable which may have variable lengths up to 12,000 feet or more.

The other elements shown in Fig. 3 will be referred to in connection with a description of the operation of the present system, which is as follows:

Any oscillation of the string 20, such as may be initiated by micro-vibrations of a statistical order, will produce a change in the capacity of the electrostatic pick-up transducer 25, since the capacitance of the condenser formed by the wire 20 and the plates 31, 33, 35 and 37 is a function of the position of the wire 20, said capacitance changing continuously as the wire moves, for example, from the position indicated by dashed line 28 to the position indicated by dashed line 29. If a fixed charge is maintained on said condenser, a voltage variation indicative of the wire deflection will be produced by the capacitance variation. A preferred cathode-follower circuit for achieving this result is shown in Fig. 2, its operation being briefly as follows:

As a result of the current flowing through the vacuum tube 120, when said tube is energized, and through resistors 122 and 124, there is developed a potential drop between plates 31, 33, 35 and 37 and the ground 125, and therefore also across the condenser formed by said plates 31—37 and the wire 20, since the wire 20 is also grounded at 127. This potential drop may be given any desired value, such as 100 volts, by a proper choice of circuit constants.

It is well known that in a cathode follower circuit, a signal voltage such as applied between the grid of tube 120 and the ground 125 will cause essentially the same signal voltage to appear between the cathode of said tube and the ground 125 due to changes in the conductance of the tube 120. This same action also results in the impedance between the grid of tube 120 and the ground 125 assuming an apparent value, of the order of 100 megohms, which is much larger than the actual value of resistors 128 and 124, which may be of the order of 6 megohms. As a consequence of this high apparent impedance, the charge on the condenser formed by the plates 31—37 and the string 20 will remain substantially constant and the capacitance changes caused by the motion of the wire will result primarily in a signal voltage at the grid of tube 120, and consequently at the cathode of said tube, said signal serving as an input signal to the driver amplifier 67 after passing through a D. C. blocking condenser 129.

The plates 32, 34, 36 and 38 are placed on the tube 23 exactly opposite to plates 31, 33, 35 and 37 respectively, with which they are identical in construction and dimensions. The plates 32—38 are connected to the cathode follower circuit at a point 130 between resistors 122 and 124, and thus are at a D. C. potential equal to that of plates 31—37, thus providing an electrostatic force on the string 20 which neutralizes the force exerted by the plates 31—37, the purpose of the pick-up transducer being merely to detect the vibration of the string 20 without reacting or exerting any force thereon.

The signal voltages from the pick-up transducer are thus transmitted through the cathode follower unit 65 to the input of the driver amplifier 67, whose output is in turn applied to energize the coil 49 of the driving transducer 27. Upon the passage of a current through coil sections 51, 53, 55, 56 and 58, forming the solenoid 49, an axial magnetic field will be produced within said solenoid. Assuming that at a particular instant the direction of flow of said current is such as to produce a magnetic field having a north pole at the upper end of the solenoid, it will be seen that at said instant the solenoid field will strengthen the effect of the magnets 42, 43, 46 and 47 and weaken that of magnets 41, 44, 45 and 48. The wire 20, being made of a material such as Invar having magnetic properties, will be deformed by magnetic forces to the position indicated at 28 in Fig. 1. A reversal in the direction of the current supplied to the driving transducer by the driver amplifier 67 will produce an opposite deflection of the wire, which will seek the position indicated at 29, an oscillatory motion being thus imposed on the wire.

It will be readily apparent to those familiar with oscillatory circuits that the present system will oscillate if the driver amplifier 67 has sufficient amplification gain and the proper phase characteristic. The driver amplifier 67 is provided with conventional automatic volume control circuit means 71 to maintain the system at a desired constant oscillation amplitude.

It will be further apparent that with the particular arrangement of the plates of the pick-up transducer 25 and of the magnets of the driving transducer 27, these transducers will have a high sensitivity to only one of the normal modes of vibration of the string 20, in the case of the particular example chosen and described hereinabove, to the 10th mode. With said arrangement, the driver amplifier 67, in conjunction with a properly adjusted automatic volume control circuit 71, will have just sufficient gain to maintain the oscillation at the predetermined 10th mode, but insufficient gain to maintain any other mode of oscillation, such as the 9th or the 11th modes. The system thus operates as an oscillator whose frequency is the natural frequency of the string for the desired mode of oscillation as determined by the gravitational force acting on the mass 21.

Although the natural frequency of string 6 is also a function of the amplitude of vibration, this amplitude effect can be rendered negligible for the system by adjusting the automatic volume control so that the amplitude is kept constant at a very small value, such for example as 20 micro inches.

The operating power, received from the surface through the same cable and filter units, is converted by the power supply circuit 83 to the proper voltages required to operate the various circuits or units of Fig. 1.

The frequency signals from the oscillating system comprising units 67 and 71, are transmitted through the line amplifier 75, filter 77, coaxial cable 80, surface filter 110 and surface amplifier 116 to the frequency meter 117, which may measure the frequency of the signals by comparing it with the frequency of a standard constant-frequency oscillator 118, frequency multiplication being used if desired.

For rough or auxiliary frequency measurements, it has been found convenient to use a cathode ray oscilloscope 110 in addition to the frequency meter. If the vertical deflection on the oscilloscope screen is a function of the signal frequency, while the sweep of the oscilloscope is a function of the standard frequency, a swinging pattern is obtained on the screen, which permits to determine by inspection whether the signal frequency is higher or lower than the standard frequency, said pattern moving in such case either to the right or to the left across the screen. This feature is of importance as it permits to ascertain whether, in addition to the normal gravitational field, there are also other varying accelerational effects acting on the instrument, whose effect will cause the screen pattern to swing back and forth.

The frequency meter itself may be of any conventional commercially available type and should preferably be able to time the signal frequency with an accuracy of one part in eight million of the fundamental time units, which is sufficiently accurate for the purposes of this invention. To minimize the extraneous accelerational effects mentioned above, frequency readings may be averaged over periods such as 5 seconds.

It is evident that the positioning of the transducers 25 and 27 is not extremely critical, and that therefore the tilting of the tube 23 from the true vertical will not effect the operation of the device as long as the mass 21 is free to swing in space without coming in contact with the walls of the tube. The necessary rough leveling of the case 102, enclosing tube 23, is provided by the gimbals 103. The bottom portion of the case 104 may be conveniently filled with a liquid such as a high viscosity silicon fluid to damp the oscillation of the case 102.

It is obvious that although the gravity meter of the present invention has been described with regard to an embodiment especially suitable for use in deep wells, said gravity meter can be advantageously used for normal measurements on the surface, in which case elements such as housings 100, 102, 104, etc. may be omitted or modified, the essential elements of the invention residing in the tube enclosing the suspended mass, the transducers associated therewith, and the electric circuits connected to said transducers.

We claim as our invention:

1. A gravity meter comprising a string, a mass suspended thereon, means for maintaining said string in oscillation at its natural frequency for a predetermined mode of oscillation, said means comprising a pick-up transducer having a plurality of condenser plates arranged along a line parallel to the string and spaced from each other by a distance equal to the distance between two adjacent nodes on said string for said predetermined mode of oscillation, circuit means having said plates connected thereto in parallel and adapted to produce upon oscillation of said string a voltage oscillating at the frequency of said string, amplifier means energized by said oscillating voltage, a driving transducer comprising a plurality of magnets arranged along a line parallel to the string in the vertical plane passing through said string and said condenser plates, and coil means surrounding said magnets, said coil means being energized by the output of said amplifier means to cause said magnets to apply to said string a force sufficient to maintain said string in oscillation at its natural frequency for said predetermined mode of oscillation, and metering means energized by said oscillating voltage for measuring the frequency thereof.

2. The system of claim 1, comprising a pick-up transducer having a first and a second set of condenser plates, the plates of the first and of the second set being each arranged along lines parallel to the string on opposite sides of the string, a cathode follower circuit having its grid terminal connected to said first set of plates and its cathode terminal connected to said second set of plates and resistor means connected in said circuit so that the second set of plates is maintained at the D. C. potential as the first set, and potential variations from the first set only are transmitted as signals to the output terminals of the cathode follower circuit.

3. A gravity meter comprising a string, a mass freely suspended thereon, a pick-up transducer means and a driving transducer means arranged longitudinally of each other along said string, each of said transducer means comprising a plurality of reactor elements positioned along a line parallel to the string and spaced from each other by a distance equal to the distance between two adjacent nodes on said string for a predetermined mode of oscillation, amplifier means having the input thereof connected to the output of the pick-up transducer means and the output thereof connected to the input of the driving transducer means, the voltage produced by the pick-up reactor elements upon oscillation of the string being amplified and applied by said amplifier means to said driving reactor elements to maintain said string in constant-amplitude oscillation at its natural frequency for said predetermined mode of oscillation, and metering means in circuit with said amplifier means for measuring said natural frequency.

4. A gravity meter comprising a string, a mass freely suspended thereon, a pick-up transducer comprising a plurality of electrostatic plate elements arranged along said string and spaced from each other by a distance equal to the distance between two adjacent nodes on said string for a predetermined mode of oscillation, said transducer plate elements being electrostatically coupled to said string, circuit means connected to said transducer plate elements and adapted to produce upon oscillation of said string a voltage oscillating at the same frequency, amplifier means energized by said oscillating voltage, said amplifier means having automatic volume control means, a driving transducer comprising electromagnetic pole elements arranged along said string longitudinally of said plate elements and spaced from each other by a distance equal to the distance between two adjacent nodes on said string for said predetermined mode of oscillation, said driving transducer being energized by the output of said amplifier means and the pole elements thereof being electromagnetically coupled to said string to apply thereto a force sufficient to maintain said string in oscillation at its natural frequency, and metering means energized by said oscillating voltage for measuring the frequency thereof.

CHARLES H. FAY.
RICHARD R. GOODELL.

References Cited in the file of this patent

UNITED STATES PATENTS

| Number | Name | Date |
|---|---|---|
| 1,995,305 | Hayes | Mar. 26, 1935 |
| 2,253,472 | Pepper | Aug. 19, 1941 |
| 2,265,011 | Siegel | Dec. 2, 1941 |
| 2,306,137 | Pabst et al. | Dec. 22, 1942 |
| 2,394,455 | Koch | Feb. 5, 1946 |